Aug. 4, 1959  H. WURZEL  2,898,135
MEANS FOR LOCKING INTERNAL RETAINING RINGS
Filed May 25, 1954  2 Sheets-Sheet 2

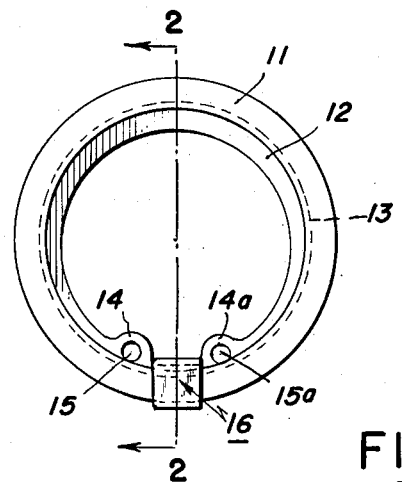
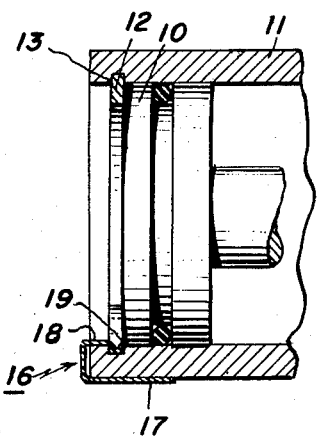
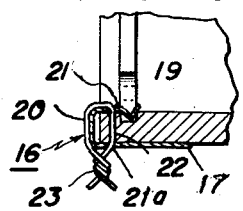
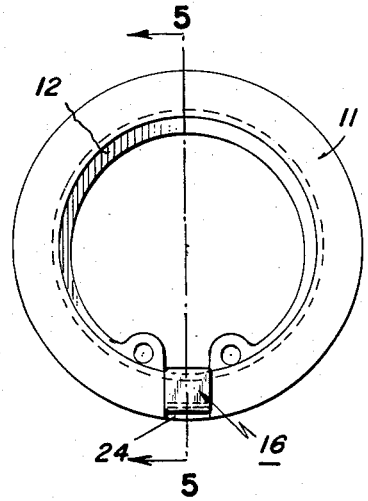
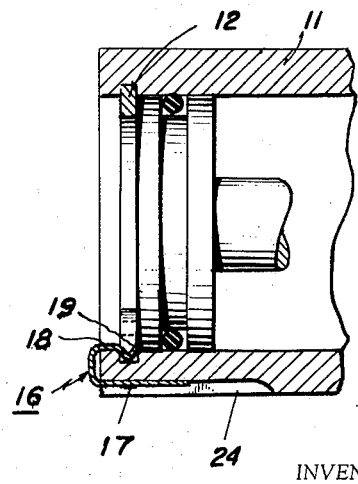

INVENTOR
HUGO WURZEL
BY
ATTORNEY

United States Patent Office 2,898,135
Patented Aug. 4, 1959

2,898,135

MEANS FOR LOCKING INTERNAL RETAINING RINGS

Hugo Wurzel, Bronx, N.Y., assignor to Waldes Kohinoor, Inc., Long Island City, N.Y., a corporation of New York Application May 25, 1954, Serial No. 432,164

6 Claims. (Cl. 287—52)

This invention relates to improvements in means for locking internal retaining rings, and more particularly to an improved and effective clip means functioning to secure internal retaining rings against accidental or unintentional removal from their grooves.

As is well known, internal retaining rings having the conventional form of a split or open-ended annulus made of spring metal are adapted, when sprung into a groove provided therefor in the bore of a housing or the like, to provide an artificial shoulder for a machine part to be located axially within the bore. While in the usual assembly employing such a ring the spring-seating action inherent in the ring suffices to secure it against removal from its groove, there are certain other ring assemblies wherein, under unfavorable conditions, the ring may contract, as permitted by the gap between the open ends thereof, thus making possible the unintentional or accidental removal of the ring from its groove. For example, if the ring should abut a fast rotating machine part, pressure is exerted on the one free end of the ring which points in the direction of rotation of said part, and such may build up to sufficient magnitude as to cause the ring to contract and thereupon jump or be driven from its groove. Also, if the ring is abutted by a machine part having corner radii, it may be "dished" by thrust exerted thereon by said machine part and, upon the angle to which the ring is dished reaching a certain size, the ring may be similarly thrown or driven from its groove.

While attempts have been made previously to overcome this danger of the ring being forced or driven from its groove, as by driving wedge-like means into the groove for the length of the ring gap, such have not met with practical acceptance because the wedge means employed are hard to assemble and still more difficult to disassemble. Moreover, the aforesaid wedge means are lacking in security in that they are held in place solely by pressure of the ring lugs and hence they may be forced from the groove by vibrations or impacts to which either the retaining ring or the whole assembly is subjected.

Broadly stated, an object of the present invention is to provide means for locking internal retaining rings against unintentional or accidental removal from their grooves, which, in addition to being highly effective under the variety of normal and abnormal working conditions encountered, is easy to assemble and disassemble.

A more particular object of the invention is the provision of an improved safety clip-type of locking means capable of effectively locking internal retaining rings against removal from their grooves.

Another object of the invention is the provision of a safety clip designed to serve as a means for locking internal retaining rings against removal from their grooves, which can be applied simply by clipping same over the edge of the housing and which may be disassembled simply by withdrawing same from engagement with said housing edge.

Yet another object of the invention is the provision of means for locking an internal retaining ring against removal from its groove, having the form of a spring U-clip capable of being shoved or pushed over the edge of the housing in position such that one leg thereof projects into the gap between the open ends of the ring, thereby to prevent contraction of the ring as can result in the ring being thrown or driven from its groove under unfavorable conditions.

A more detailed object of the invention is the provision of a simple yet effective means for positively securing in place a safety clip serving to lock an internal retaining ring against removal from its groove.

The above and other objects and features of advantage of the internal ring locking means according to the present invention will appear from the following detailed description thereof, taken with the accompanying drawings illustrating various physical forms of such locking means and assemblies employing same, in which—

Fig. 1 is a view looking into an end of an internal retaining ring assembly incorporating one form of ring-to-groove locking means according to the invention;

Fig. 2 is a section taken along line 2—2 of Fig. 1;

Fig. 3 is a detail view illustrating a portion of the assembly shown in Figs. 1 and 2, but in which the locking means is secured in place by positive securing means;

Figs. 4 and 5 are views corresponding to Figs. 1 and 2, respectively, illustrating a variant form of housing which provides accommodation for one arm of the locking means;

Figure 6:
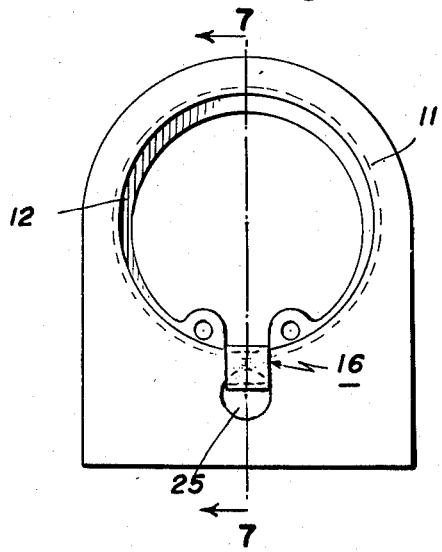
Figure 7:
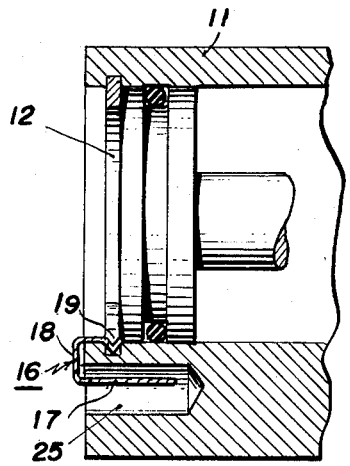
Figure 8:
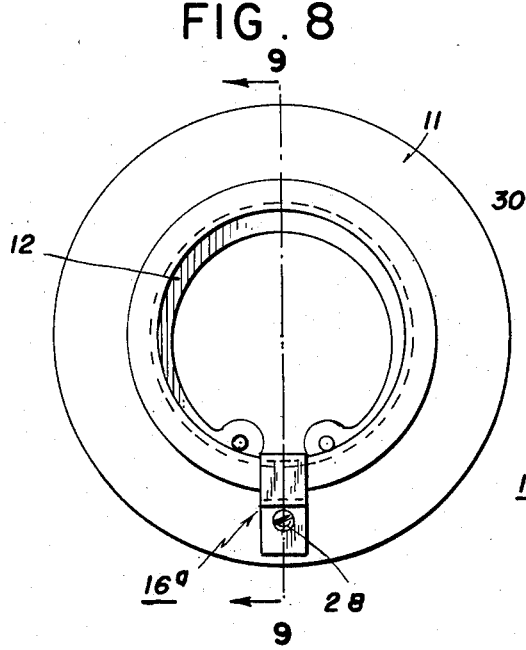
Figure 9:
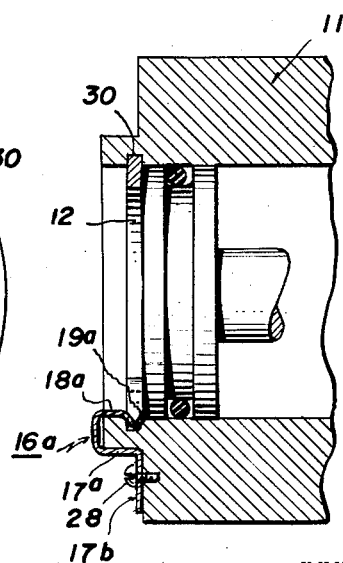

Figs. 6 and 7 are views similar to Figs. 4 and 5 illustrating yet another means for accommodating one arm of the locking means; and Figs. 8 and 9 are views also corresponding to Figs. 4 and 5, illustrating a varient form of locking means and another means for positively securing said means in place.

Referring to the drawings, the invention has been illustrated in an assembly of the type wherein the outer race 10 of a ball bearing is located axially within the bore of a housing 11 by means of an internal retaining ring 12 whose outer edge seats in a circular groove 13 cut into the surface of the housing bore, and whose inner of shoulder-forming edge extends into the bore so as to form an artificial shoulder for said bearing race. As best seen in Fig. 1, the ring 12 is of the so-called tapered type, characterized in that the section heights of the ring body decrease from its mid section towards its free ends, whereby the ring deforms circularly and hence when properly dimensioned has pressure fit all around against the bottom of the groove 13 when spring-seated in said groove. Preferably, the free ends of the ring are formed as inwardly directed lugs 14, 14a provided with apertures 15, 15a for the insertion of the tips of pliers conventionally employed in handling and assembling such rings.

As is well known, when spring-seated in its groove 13, an internal ring corresponding to the illustrated ring 12 bears against its groove bottom with sufficient spring pressure as to secure itself from removal from its groove under normal operating conditions. However, due to the fact that a gap must be provided between the free ends of such a ring to permit its contraction during assembly and disassembly, any adverse condition encountered in actual use of the ring which causes the ring to contract may result in the ring jumping or being driven from its groove, with serious consequences to the assembly as a whole.

According to the invention, such objectionable contraction of the ring is positively prevented through the provision of means insertible into the gap between ring ends and which functions positively to prevent the ring ends from moving towards one another. As best seen in Fig. 2, such means preferably takes the form of a U-clip generally designated 16 made of springy sheet metal. One arm 17 of the clip serving as the outer arm may be formed long so as to have appreciable bearing surface against the outer surface of the housing 11, while the arm 18 has shorter length which is preferably such that it extends into the housing bore to approximately the plane of the groove 13. The spacing between the arms 17 and 18 bears definite relation to the thickness of the wall of the housing 11, being preferably slightly less than the thickness of said wall so that the clip embraces and grips the wall from both sides with spring pressure. Moreover, the width of at least the shorter arm 18 of the clip corresponds generally to the width of the gap between the apertured end lugs 14, 14a of the ring, as best seen in Fig. 1. While under certain conditions the width of the clip arm 18 may be slightly less than the width of the gap, in all cases it is always such as to preclude shortening of the gap by any dangerous amount as could result in decrease in the radius of the ring to the extent that it can jump from its groove. Illustratively, the shorter clip arm 18 terminates in a V-shaped end 19 which, when the clip is fully assembled, snaps into the groove 13, thus acting as a spring detent giving the clip a hold on the housing 11 in addition to that resulting from its spring-clip action. Other end shapes, such as that of a hook, may provide the detent.

From the above, it will be seen that a safety or locking clip as aforesaid may be assembled and disassembled in exceedingly simple manner. In assembly, it is simply aligned with the ring gap and pushed over the edge of the housing 11 until the detent (V-end) 19 snaps into the length of groove extending between the ring ends. Thereupon the clip is held not only by the spring pressure which it exerts on the housing wall, but also it is additionally secured by the action of the detent 19 on the side wall or walls of the groove 13. When the clip is so assembled, the clip arm 18 positively precludes movement of the ring ends towards one another and hence secures the retaining ring 12 against accidental or unintentional removal from its groove 13.

While its aforesaid spring and detent action normally suffices to secure the clip in place on the housing 11, additional securing means may be provided if considered desirable or necessary to a particular assembly. Referring to Fig. 3, such additional means may take the form of a tie wire 20, doubled on itself and having one end threaded through aligned holes 21, 21a in the clip and 22 in the housing, and its terminals securely twisted as at 23. Upon proper assembly of clip 16 and tie wire 20 as illustrated, the clip is of course positively secured against unintentional or accidental separation from the housing 11, thus providing a high degree of security to the assembly as a whole.

In an assembly where it is not desirable or practical that the longer clip arm 17 extend externally of the housing 11, an outwardly opening slot or channel 24 of width and length as to accommodate said arm may be milled or othewise formed in the external surface of the housing, as illustrated in Figs. 4 and 5. It will of course be understood that the spacing of the clip arms is such as to provide for the reduced thickness of the housing edge consequent to such slotting, i.e. the thickness between the bottom of the slot 24 and the internal surface of the housing bore.

In case the housing is formed extra thick, or if the housing portion to which it is desired to attach the clip 16 is solid as in Figs. 6 and 7 and hence does not permit of the longer arm 17 of the clip extending externally of same, a hole 25 may be drilled into the housing for the purpose of receiving said longer clip arm 17. Such permits a more or less standard size of safety clip to be employed with housings of different shapes and wall thicknesses.

Should the end face of the housing be stepped so as to provide a circular rib 30 extending about the bore mouth, as is seen in Figs. 8 and 9, it is possible to effect ready securement of a safety clip generally as described by a slight modification of its outer arm. According to such modification, the clip outer arm has a length portion 17a extending parallel to the shorter (inner) arm 18a thereof, and a depending right-angular length portion 17b which is adapted to lie flush against the vertical end face proper of the housing. According to such arrangement, the modified clip 16a embraces and resiliently secures to the circular rib 30 just as the previously described clip 16 clips to the edge of the housing 11 as in Fig. 2, for example, while at the same time the modified clip may additionally be secured as by a screw 28 passed through its depending arm portion 17b and threaded into the housing and proper as illustrated.

From the above, it will be seen that a safety or locking clip according to the invention achieves the objectives therefor outlined in the foregoing. In addition to providing an effective means for locking an internal retaining ring against removal from its groove, the clip 16 (or 16a) may be assembled merely by pushing it over the edge of the housing in position such that its inner or shorter arm enters the gap between the ring ends, and it may be disassembled by the equally simple operation of pulling or prying it away from said housing edge. While a safety clip according to the invention is so fashioned and constructed that it inherently secures itself to the housing, nevertheless its construction is such that additional securing means, in the form of a tie wire or screw, may be simply applied thereto in assemblies where positive clip-securing means is considered desirable or necessary.

As many changes could be made in carrying out the above construction without departing from the scope of the invention, it is intended that all matter contained in the above description or shown in the accompanying drawings shall be interpreted as illustrative and not in a limiting sense.

I claim:

1. A retaining ring assembly comprising, in combination, a housing having a bore provided with a circular groove opening through the bore wall, an internal open-ended retaining ring seated in said groove with its ends spaced apart, the outer edge of the ring bearing with spring pressure against the groove bottom, the inner edge portion of the ring extending into said bore and forming an artificial shoulder therein, and means locking said ring against accidental or unintentional removal from said groove comprising a U-clip made of spring material and having spaced parallel arms, said clip being clipped to and extending inwardly of the edge of the housing in position such that one arm thereof extends axially through the bore and into the space between the open ends of the ring, the width of said clip arm corresponding substantially to said space whereby said clip is effective to prevent movement of the ring ends towards one another, and said one clip arm having a detent seating with snap action in the groove portion extending between the ring ends thereby to hold said clip to the housing.

2. A retaining ring assembly as set forth in claim 1, wherein said one clip arm terminates in said detent.

3. A retaining ring assembly as set forth in claim 1, wherein the housing is provided with an externally opening slot having length and width corresponding substantially to the length and width of the other arm of the clip, and said other arm seating in said slot.

4. A retaining ring assembly as set forth in claim 1, wherein the housing is provided with a hole opening through its end face and extending generally parallel to the bore for receiving the other arm of the clip, and said outer arm extending into said hole.

5. A retaining ring assembly as set forth in claim 1, wherein said U-clip is secured against accidental dislodgement from the housing by means of a tie wire threaded through aligned holes provided in both the clip arms and in the edge of the housing embraced by said arms.

6. A retaining ring assembly as set forth in claim 1, wherein the end face of the housing is formed with a circular rib axially offset from the end face proper and which extends about the mouth of the bore, and wherein said other arm of the clip includes an angularly bent portion extending flush against the end face proper of the housing, and wherein the clip is positively secured to the housing by a screw passed through said angularly bent clip-arm portion and threaded into said end face proper.

References Cited in the file of this patent

UNITED STATES PATENTS

| | | |
|---|---|---|
| 227,775 | Hemp | May 18, 1880 |
| 570,101 | Norlund | Oct. 27, 1896 |
| 640,465 | Gillmer | Jan. 2, 1900 |
| 828,402 | Hart | Aug. 14, 1906 |
| 886,608 | Jerseman | May 5, 1908 |
| 1,063,763 | Altop | June 3, 1913 |
| 1,217,804 | Metzger | Feb. 27, 1917 |
| 2,154,537 | Stenberg | Apr. 8, 1939 |
| 2,369,480 | Mills | Feb. 13, 1945 |
| 2,389,825 | Smith | Nov. 27, 1945 |
| 2,491,306 | Feitl | Dec. 13, 1949 |

FOREIGN PATENTS

| | | |
|---|---|---|
| 349,329 | Great Britain | May 28, 1931 |